DEVICES FOR AUTOMATIC RETURN OF THE PICK-UP ARM
TO THE NORMAL POSITION IN RECORD PLAYERS

Filed March 10, 1964 7 Sheets-Sheet 1

March 14, 1967 M. J. H. STAAR 3,309,093

DEVICES FOR AUTOMATIC RETURN OF THE PICK-UP ARM
TO THE NORMAL POSITION IN RECORD PLAYERS

Filed March 10, 1964 7 Sheets-Sheet 2

March 14, 1967 M. J. H. STAAR 3,309,093

DEVICES FOR AUTOMATIC RETURN OF THE PICK-UP ARM
TO THE NORMAL POSITION IN RECORD PLAYERS

Filed March 10, 1964 7 Sheets-Sheet 3

March 14, 1967 M. J. H. STAAR 3,309,093

DEVICES FOR AUTOMATIC RETURN OF THE PICK-UP ARM TO THE NORMAL POSITION IN RECORD PLAYERS

Filed March 10, 1964 7 Sheets-Sheet 5

United States Patent Office 3,309,093
Patented Mar. 14, 1967

3,309,093

DEVICES FOR AUTOMATIC RETURN OF THE PICK-UP ARM TO THE NORMAL POSITION IN RECORD PLAYERS

Marcel Jules Hélène Staar, 4 Ave. Sylviane, Rhode-Saint-Genese, Belgium
Filed Mar. 10, 1964, Ser. No. 350,754
Claims priority, application Belgium, Mar. 12, 1963, 629,470
11 Claims. (Cl. 274—15)

This invention relates to single record players—i.e., record players of the kind wherein the records to be played are placed manually on the turntable one after another—and in particular to the automatic return of the pick-up arm to the normal position.

Most devices of this kind have a turntable-starting device operated by movement of the pick-up arm manually from its normal position, the same device stopping the turntable drive at the end of the record, the pick-up arm then staying on the stopped record and therefore having to be moved manually back to its normal position before the record can be removed.

It is an object of this invention to provide a device for automatically returning the pick-up arm to its normal position at the end of each record and for simultaneously switching off the turntable motor, the device being embodied by simple means whose cost is low enough for them to be used with this kind of record player.

Devices for returning the pick-up arm to its normal position at the end of a record are already known in automatic record changers and in special automatic record players. The devices used in systems of this kind for returning the pick-up arm from one part of a mechanical whole responsible inter alia for placing the records on the turntable, placing the pick-up arm in the first groove of the record to be played and so on, as well. It would be uneconomical to use systems of this kind just to return the pick-up arm even if the mechanism were to be limited to the elements needed just for this operation, since the manner in which they derive their power from the record-driving apparatus would make them too expensive.

A feature of the device according to the invention is its simplicity which is the result mainly of the fact that the pick-up arm is returned by a pulse from an element which stores the energy required for the arm return movement just by the normal operation of the arm to start the turntable-driving device. A main feature of the device according to the invention is that a control member is provided which is driven by the pick-up arm and which is so disposed that, when the pick-up arm is pivoted a few degrees from its normal position and away from the turntable, the control member is pivoted towards the center of the turntable against the force of a spring which is secured to the turntable and to the base or frame and is adapted to return the control member to its initial position. In short, therefore, pivoting the pick-up arm a few degrees from its normal position away from the turntable pivots a control member towards the turntable center against the force of a spring tending to return the control member to its initial position. At a predetermined part of the movement of the control member, a retaining element operates and maintains the control member in a position in which the same initiates closure of the turntable-driving motor and the opening of the pick-up head muting switches.

When the pick-up arm engages in the final groove of the record, it acts—through the agency of a fluid transmission system of the kind described in Belgian Patent 530,858—on the retaining element and releases the control member which is returned by the spring to its normal position and causes the following operations as it pivots:

(a) The pick-up arm to be raised off the record disc and be maintained in the raised position;

(b) The opening of the turntable-driving motor circuit;

(c) The closure of the muting switches, and (d) The lateral movement of the pick-up arm towards the support in its normal position, and the lowering of the arm onto such support.

For a better understanding of the invention and to show how the same may be carried into effect, reference is now made to the accompanying drawings wherein:

FIG. 1 illustrates the mechanism with the pick-up arm in the normal position;

FIG. 1*a* is a vertical section through FIG. 1;

FIG. 1*b* is a horizontal section taken along the line I*b*—I*b* of FIG. 1*a*;

FIG. 1*c* is a section taken along the line I*c*—I*c* of FIG. 1;

FIG. 2 illustrates the complete mechanism at the time when the pick-up arm has been raised and moved manually into the "on" position so that the arm return device has just been moved into the stand-by position;

FIG. 2*a* is a vertical section through FIG. 2;

Figure 2:
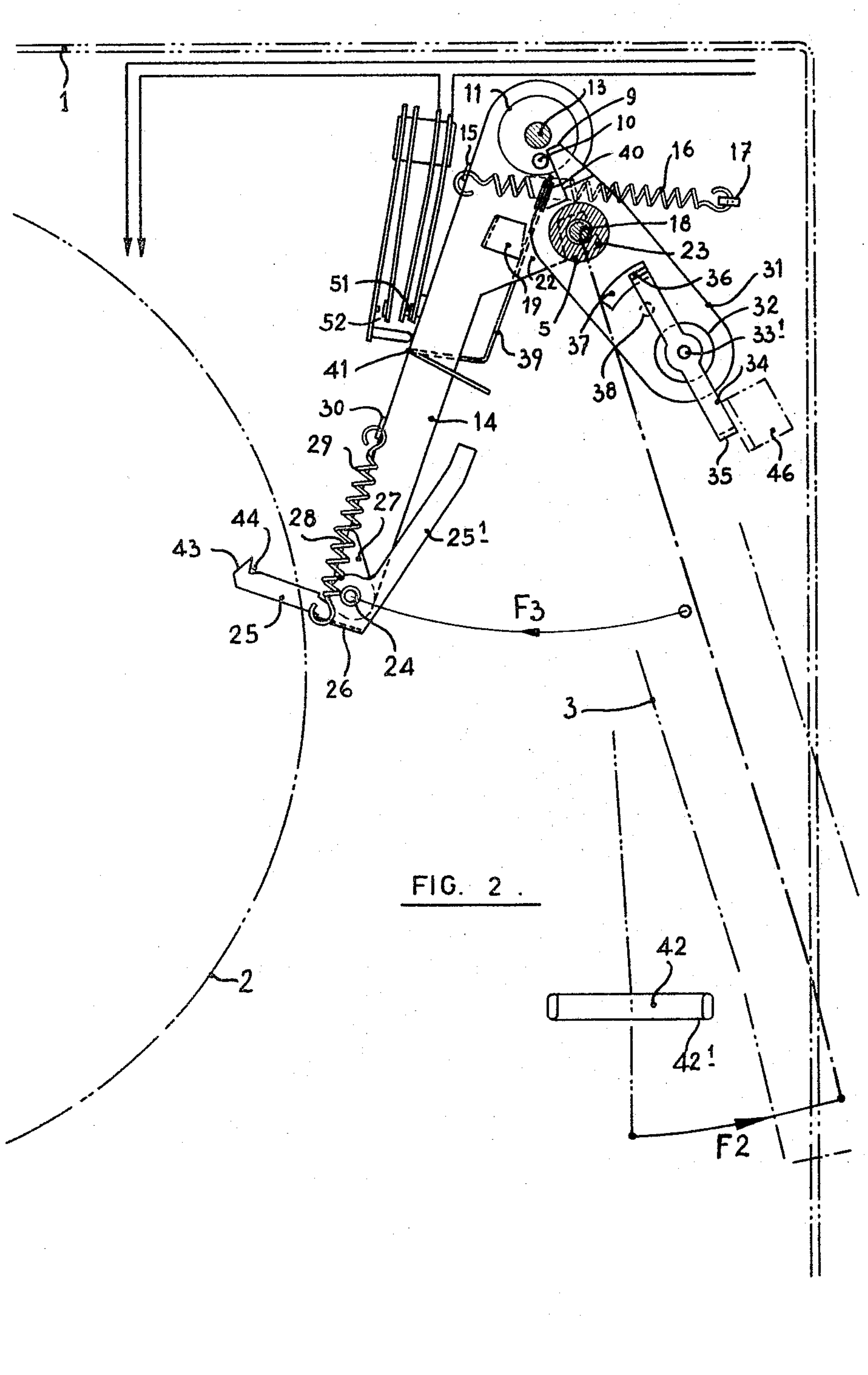
Figures 2, 5, 6:
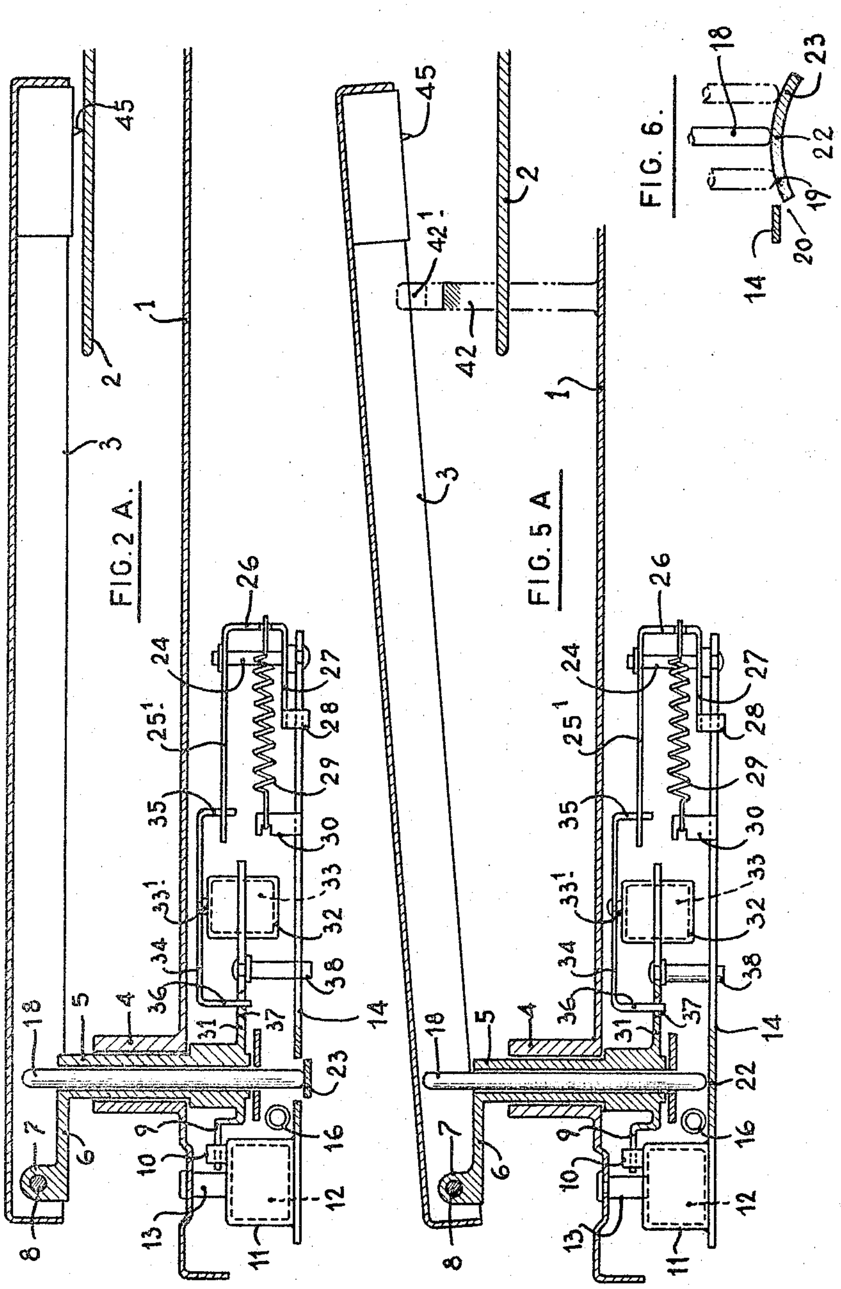
FIG. 5 shows the pick-up arm return mechanism starting its return movement; the arm has been raised to free the needle from the final groove, the switch for the turntable motor is open, the record player has stopped and the arm is about to be moved back into the normal position illustrated in FIG. 1.

FIG. 5*a* is a vertical section through FIG. 5, and

FIG. 6 is a section along the line VI—VI of FIG. 5.

Referring to the accompanying drawings, there can be seen a record player frame 1, a record 2 for playing on the turntable (not shown) and a pick-up arm 3. Rigidly secured to the frame 1 is a sleeve 4 in which a hollow shaft 5 rotates, the shaft 5 having a horizontal part 6 formed with an aperture 7 through which extends a spindle 8, the pick-up arm 3 pivoting vertically on the spindle 8 in the manner shown in FIGS. 1 and 1*a*. Near the bottom the hollow shaft 5 has a cam 9 engageable with a pin 10 borne by a cylinder 11 which can rotate around a sleeve 12 secured to the frame 1 by a spindle 13 and which is rigidly secured to a flat lever 14 forming a control member. The lever 14 has a hook 15 to which one end of a spring 16 is secured, the other end thereof being secured at 17 to the frame 1. The hollow spindle 5 receives a rod 18 which can slide vertically and which, when the pick-up arm is in the normal position, rests on a ramp 19 (FIGS. 1*a* and 6) formed in the lever 14 by a cut-out at region 20.

When the lever 14 moves, ramps 19, 22, 23 move along a path T (FIG. 1*b*) concentric with the axis formed by the elements 12, 13; when this movement is performed in the direction indicated by an arrow $F_1$ (FIG. 1*b*), the rod 18 is first raised in accordance with the inclination of the ramp 19, then rests on the part 22 (FIG. 6), and is then lowered by an opposite ramp 23. The lever 14 has, at the end remote from the cylinder 11, a spindle 24 on which an L-shaped lever 25, 25[1] (FIG. 2) can pivot; the lever 25, 25[1] has a bent part 26 which extends first downwards, then horizontally, as denoted by the reference 27, and is articulated to a spindle 24; the part 27 has an abutment 28 which bears against the wall of the lever 14. The lever 25, 25[1] forms a retaining element which will be described hereinafter. A spring 29 has one end secured to the descending arm 26 and the other end secured to a hook 30 forming part of the lever 14. On the side opposite the cam 9, the hollow shaft 5 has a lever 31 bearing a cylinder 32 in which a rotatable piston 33 can rotate with the interposition of a viscous liquid, in the manner disclosed in applicant's Belgian Patent 530,858; the piston 33 has a spindle 33[1] which extends through the cover of the cylinder 32 and to which a lever 34 is secured, one arm thereof having a claw 35 co-operating with the arm 25[1] of the lever 25, 25[1], while the other arm of the lever 34 has a bent part 36 which engages in a slot 37 in the lever 31. A downwardly extending rod 38 is secured to the lever 31.

A wire spring 39 (FIG. 2) is secured to the lever 14 at 40 near the cylinder 11, contacts the rod 38 at particular times, and engages at its end around the lever 14 to form a hairpin bend 41.

Figures 1, 1C:
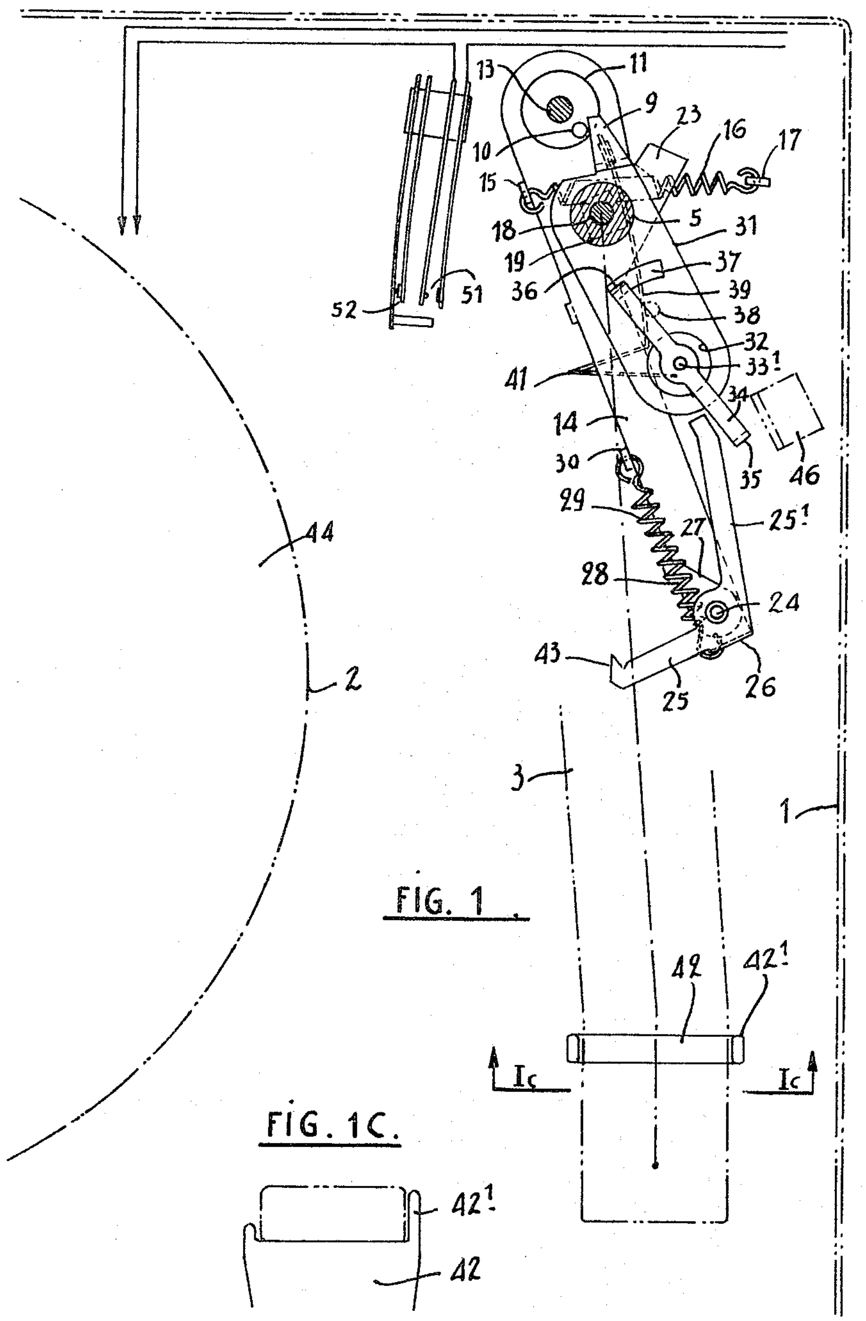
Figure 1A:
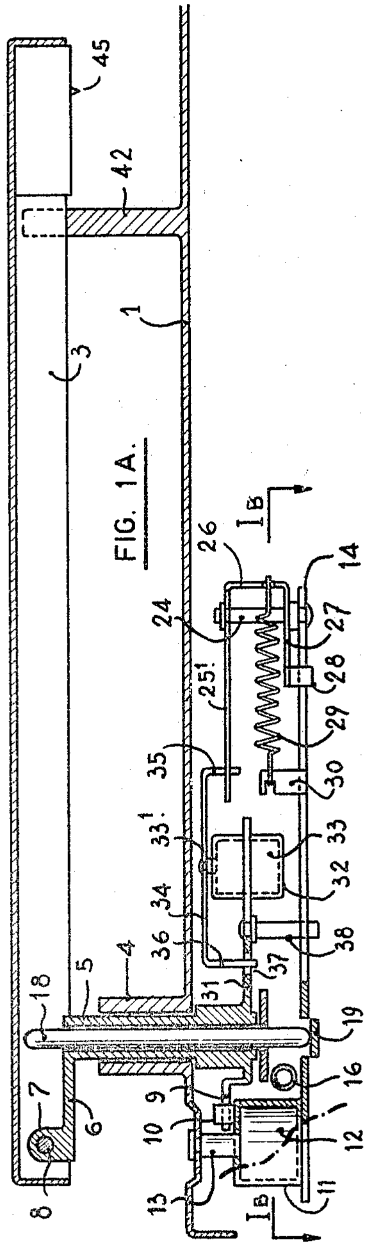
Figure 1B:
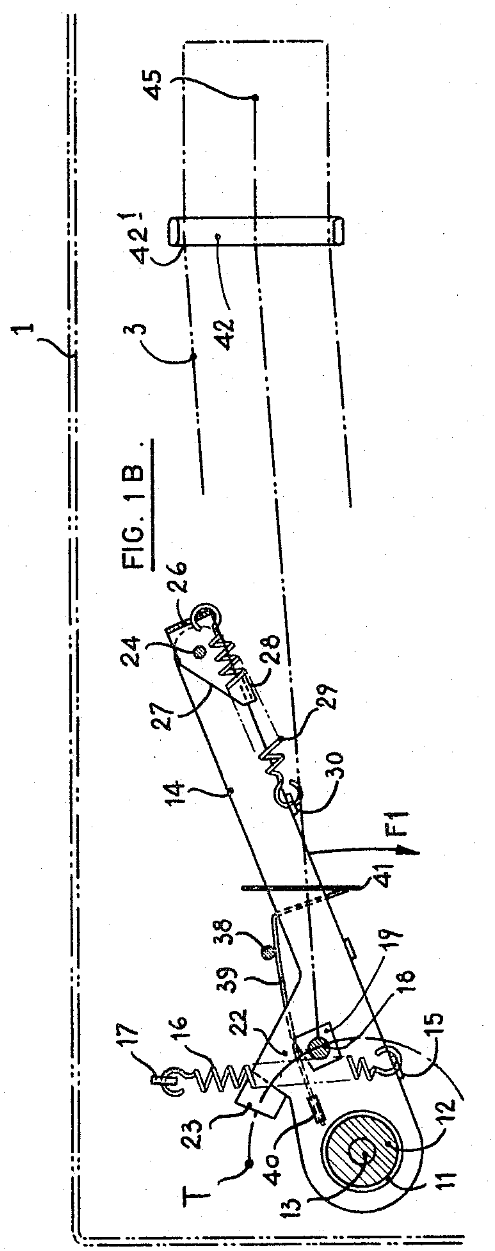

The device operates as follows:

In the position illustrated in FIG. 1, the arm is in the normal position and rests on its support 42 which is rigidly secured to the frame 1 (FIGS. 1, 1*a*, 1*c*). Before a record is played the pick-up arm 3 is lifted manually above its support and pivoted from its normal position in the direction of arrow $F_2$ (FIG. 2)—i.e., away from the turntable. The cam 9 forming part of the hollow shaft 5 rigidly secured to the arm 3 therefore acts on the pin 10 to pivot the lever 14 around its spindle 13 against the action of spring 16, as indicated by arrow $F_3$ in FIG. 2, until, when end 35 of lever 34 abuts an abutment 46 rigidly secured to the frame, the bent part 36 of the lever 35 meets the end of the slot 37, as shown in FIG. 2, after having damped the end of the pick-up arm travel by pivoting in the viscous liquid. Meanwhile, the cam 43 of the retaining member 25, 25[1] has engaged behind a rod 44 rigidly secured to the frame and, against the pull applied by the spring 16, maintains the lever 14 in a position in which the same closes a switch 51 in the motor supply circuit and keeps open a pick-up head muting switch 52. Simultaneously, the ramp 23 rigidly secured to the lever 14 has caused the rod 18 to take up the position which is shown in FIG. 2*a* and in which the rod 18 allows the pick-up arm to descend freely onto the record and engage therewith by its needle 45.

Figure 3:
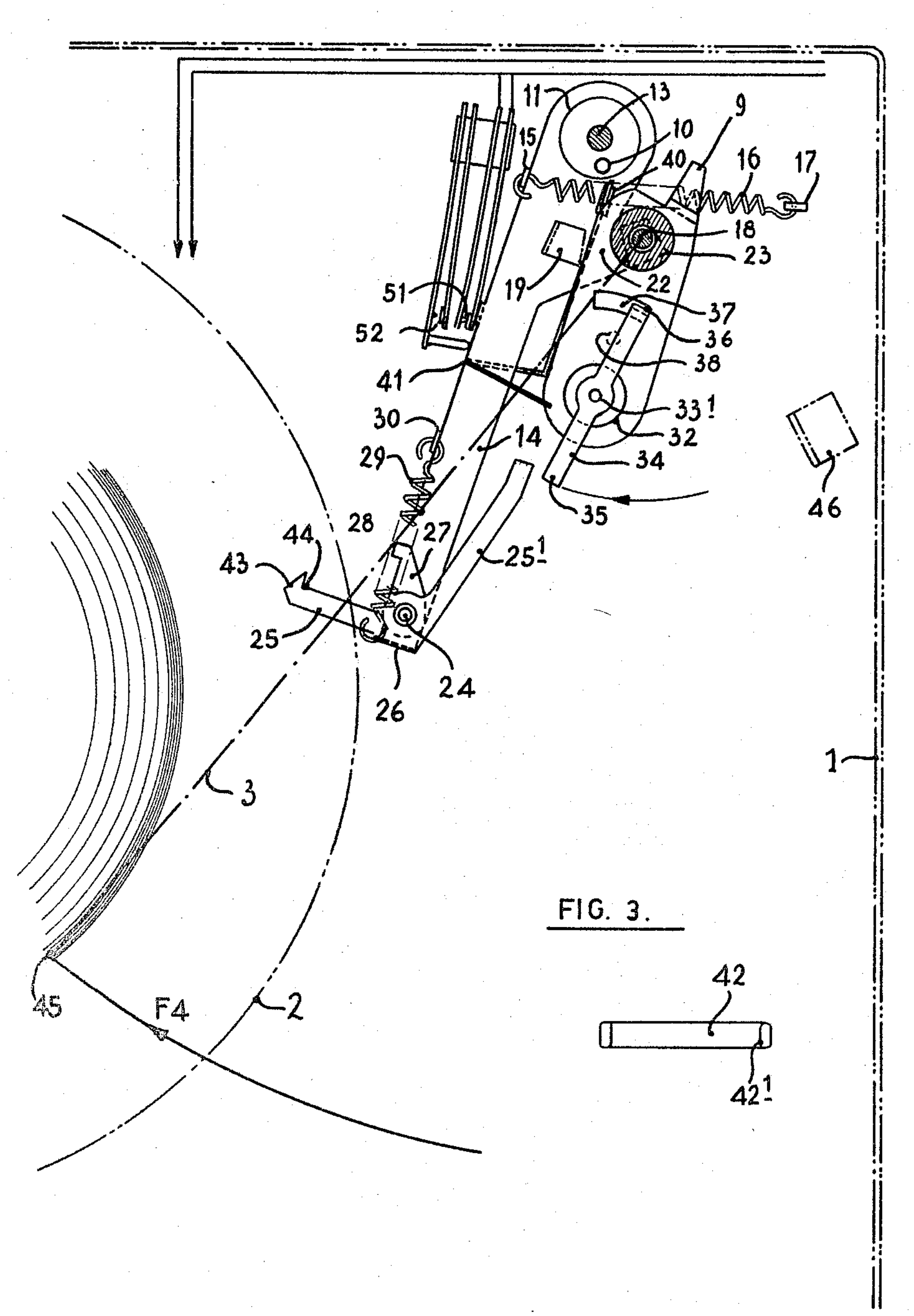
FIG. 3 illustrates the mechanism at the time when the needle reaches the end of the record grooving.

When playing has started the pick-up arm 3 moves along the grooves (arrow $F_4$ in FIG. 3) but the assembly of elements 14, 25[1], 25, 43 remains stationary because it is engaged with the rod 44 by the cam 43.

Figure 4:
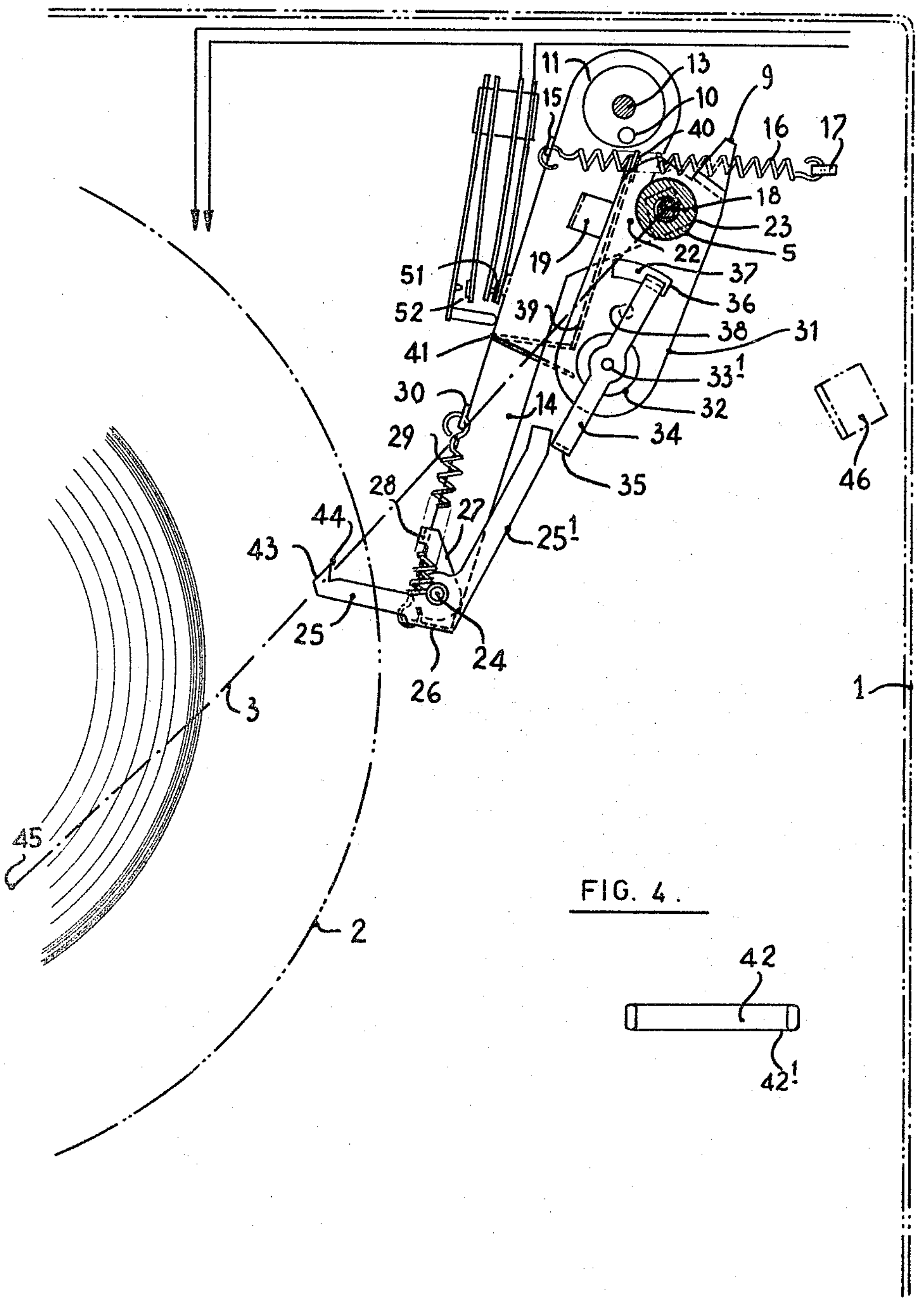
FIG. 4 illustrates the mechanism at the time when the needle is near the end of the final groove; the pick-up arm return device is about to be released and moved back, taking the pick-up arm with it.
Figure 5:
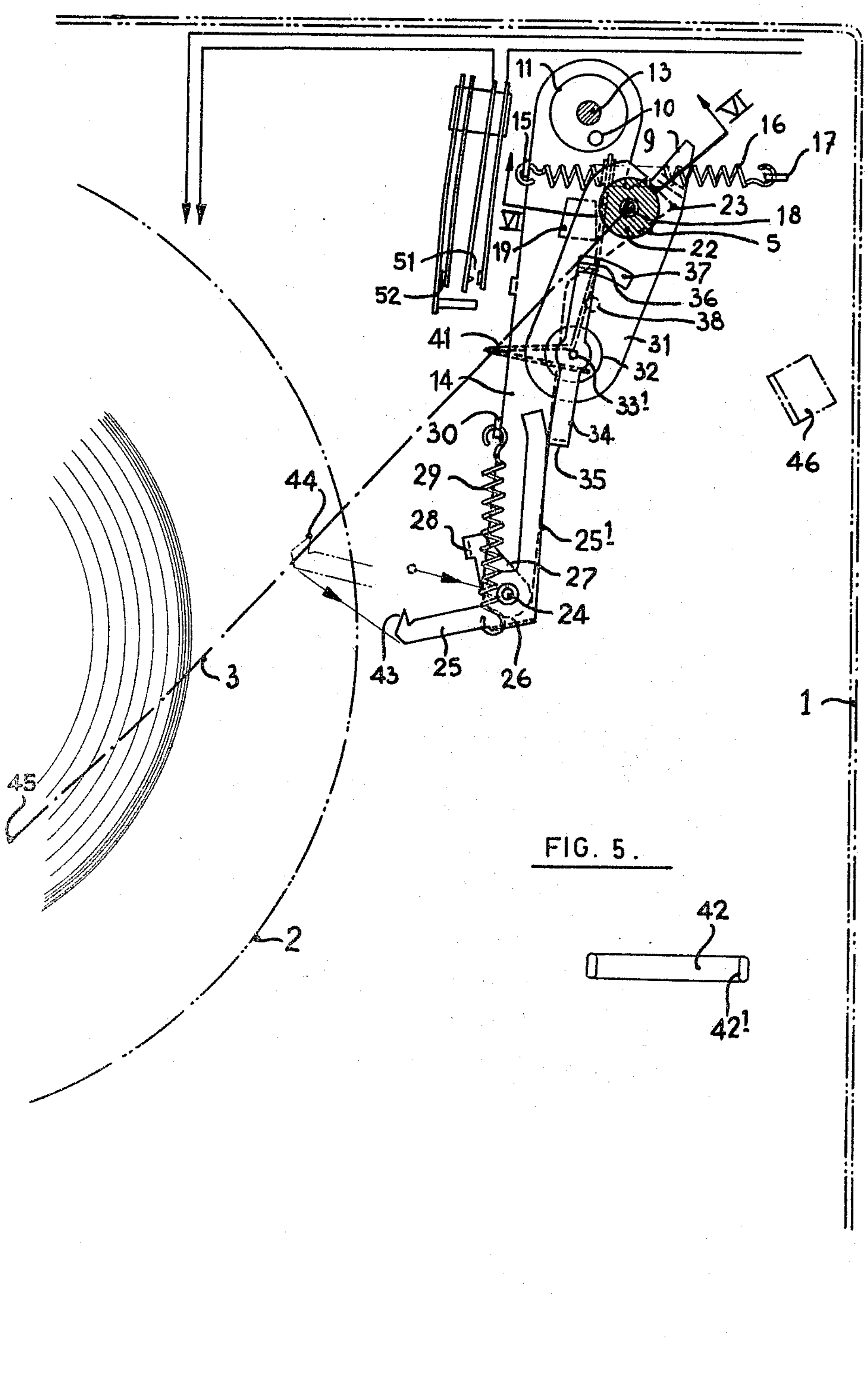

At the end of playing (FIG. 4) the lever 31 which follows the movements of the arm 3 acts by way of the arm 35 of the lever 34 upon the arm 25[1] of the lever 25, 25[1], in the manner described in Belgian Patent 530,858, so that when the arm 25 is driven by the final groove, the arm is tilted around the spindle 24 so that the cam 43 is disengaged from the rod 44; the lever 14 is therefore released and returned to its initial position by the spring 16 and the switch 51 is opened.

During this movement (FIG. 5) the pick-up arm is first raised by the rod 18, through the agency of the ramp 23 of the lever 14, and is kept in the raised position by the part 22 of the ramp 23 (FIGS. 5*a* and 6). The lever 14, as it continues to be moved by the spring 16, acts by way of the end of the spring 39 (FIG. 5) to thrust the rod 38 secured to the lever 31 and moves the pick-up arm towards the support in its normal position until the arm part 42[1] forming an abutment is struck. Thereafter the lever 14 pivots a few degrees further to tense the wire spring 39, so that the ramp 19 moves below the rod 18 and the arm 3 is lowered onto the support 42. The lever 14 ceases its movement at the time when its wall abuts the rod 38 secured to the lever 31.

The pick-up arm acts on the retaining element 25, 25[1] by way of the fluid transmission device 32–35 in the manner described in Belgian Patent 530,858—i.e., the pick-up arm acts on the retaining element only when the rate of movement of the pick-up arm radially of the disc increases in a manner corresponding to the coarser pitch of the final groove of the record.

In addition to returning the pick-up arm, the release of the member 14 leads to the arm being lifted off and maintained above the record, to the opening of the circuit of the driving motor, and to the closure of the said muting switches. An important feature is that in a device of this kind the pick-up arm is returned solely by means of energy stored (in the spring 16) during operation of the pick-up arm to start the turntable before the record is played.

What I claim is:

1. A record player having a base, a turntable mounted on said base and a pick-up arm pivotally mounted on the base for horizontal and vertical movement, said player comprising first means coupled to the arm for common horizontal pivotal movement therewith, second means pivotally mounted on the base for horizontal movement and engageable with the pick-up arm and the first means, third means engaged with said second means and with the pick-up arm for acting on the latter to selectively enable raising and lowering thereof, said pick-up arm having a normal rest position and an operative position for playing a record on the turntable, said pick-up arm being horizontally pivotable in a direction away from the turntable to produce pivotal movement of the second means to a lock position through the action of the first means, spring means acting on said second means and energized by the movement of the second means to said lock position, switch means for controlling the turntable drive positioned relative to the second means for being activated by the second means in said lock position, said first means releasing the second means from the lock position thereof when the pick-up arm is at the end of a record on the turntable, said spring means acting on said second means and the pick-up arm engaged therewith to return the latter towards its normal rest position, and abutment means for engaging the pick-up arm and retain the same in an angular position corresponding to said rest position, said third means being engaged by the second means when the pick-up arm is initially moved away from the turntable to permit free vertical pivotal movement of the pick-up arm, whereas when the second means is released from its lock position it acts on the third means to raise the pick-up arm and prevent downward movement thereof, said second means further acting on the third means when the pick-up arm has been returned to said angular position to cause lowering of the pick-bp arm to its rest position in a state in which the arm is free to be raised when a subsequent record is to be played.

2. A record player as claimed in claim 1 comprising muting switch means operatively positioned in the path of movement of said second means for being opened with the latter in its lock position.

3. A player according to claim 1 wherein said second means comprises a control member pivotally mounted from the base such that when the pick-up arm is pivoted from its normal rest position away from the turntable, said control member is pivoted towards the center of the turntable, said spring means being secured to the control member and to the base so that said control member is acting against the force of said spring upon displacement towards the center of the turntable.

4. A player according to claim 3 wherein the second means further comprises a retaining member in the form of an L-shaped lever having a bent part which extends first downwards then horizontally and pivotally mounted on said control member, the horizontal part of the L-shaped lever having an abutment adapted to cooperate with the control member, and a spring connected to the descending arm of the bent part and to said control member.

5. A device according to claim 3 wherein the control member is a flat lever, said first means comprising a hollow spindle rigidly secured to the pick-up arm and a cam on said spindle for operatively displacing the lever.

6. A device according to claim 5 wherein said third means comprises a rod which can slide vertically, said control member including a portion with a ramp, said rod resting on said ramp when the pick-up arm is in the normal position.

7. A device according to claim 6 in which said rod is vertically slidable in the hollow spindle.

8. A device according to claim 7 wherein said ramp includes a raised portion and adjacent lower portions, said rod being first raised by the raised portion of the ramp when said control member moves towards the record turntable and then rests thereon, after which the rod is then lowered by the opposite lower portion.

9. A player according to claim 7 wherein said first means further comprises a lever, a cylinder on the latter said lever, a rotatable piston supported in the cylinder with the interposition of a viscous liquid, the last-mentioned piston having a spindle extending through the cover of the cylinder, a further lever mounted on the last said spindle having one arm with a bent-down part cooperating with one arm of the retaining lever, while the other arm of said further lever extends into a slot in the lever which supports the cylinder.

10. A device according to claim 9 comprising a wire spring secured to the control member for engaging said lever which supports the cylinder.

11. A device as set forth in claim 10 wherein said further lever acts on the retaining lever to pivot the same when the pick-up arm is driven by the final groove in the record to release the retaining lever after which the control member is released and returned to its initial position by said spring means.

References Cited by the Examiner

UNITED STATES PATENTS

| | | | |
|---|---|---|---|
| 2,305,086 | 12/1942 | Johnson | 274—14 |
| 2,596,016 | 5/1952 | Falk | 274—1 |
| 2,961,242 | 11/1960 | Zimmerman et al. | 274—14 |
| 3,004,764 | 10/1961 | Staar | 274—23 X |

NORTON ANSHER, *Primary Examiner.*

J. F. PETERS, *Assistant Examiner.*